United States Patent [19]

Glaser

[11] 4,155,605

[45] May 22, 1979

[54] WICK LUBRICATION SCHEME FOR HIGH SPEED SHAFTS

[75] Inventor: Jerry Glaser, Playa Del Rey, Calif.

[73] Assignee: The Garrett Corporation, Los Angeles, Calif.

[21] Appl. No.: 851,035

[22] Filed: Nov. 14, 1977

[51] Int. Cl.² ............................................. F16C 1/24
[52] U.S. Cl. ................................. 308/187; 184/1 E; 308/132
[58] Field of Search ................ 308/99, 187, 111, 132, 308/133, 240, 70, 87 R; 184/1 E, 102

[56] References Cited

U.S. PATENT DOCUMENTS

| | | | |
|---|---|---|---|
| 236,882 | 1/1881 | Fisher | 308/132 |
| 1,433,424 | 10/1922 | Stoner | 308/70 |
| 1,448,157 | 3/1923 | Selik | 308/70 |
| 1,550,834 | 8/1925 | Miller | 308/70 |
| 1,656,702 | 1/1928 | Finch | 308/132 |
| 2,492,672 | 12/1949 | Wood | 308/187 X |
| 2,522,985 | 9/1950 | Bradley | 308/132 |
| 2,754,579 | 7/1956 | Shewmon | 308/132 X |
| 2,942,919 | 6/1960 | Beerli | 308/187 |
| 3,361,496 | 1/1968 | Cunningham | 308/132 |

FOREIGN PATENT DOCUMENTS

| | | | |
|---|---|---|---|
| 61453 | 6/1913 | Austria | 308/111 |
| 189678 | 12/1922 | United Kingdom | 308/111 |
| 680478 | 10/1952 | United Kingdom | 308/132 |

*Primary Examiner*—David H. Brown
*Attorney, Agent, or Firm*—Joel D. Talcott; Albert J. Miller

[57] ABSTRACT

A wick lubrication scheme provides sufficient quantities of oil for bearing lubrication on high speed shafts even under low atmospheric pressure conditions as exist as high altitude.

5 Claims, 5 Drawing Figures

Fig. 1.
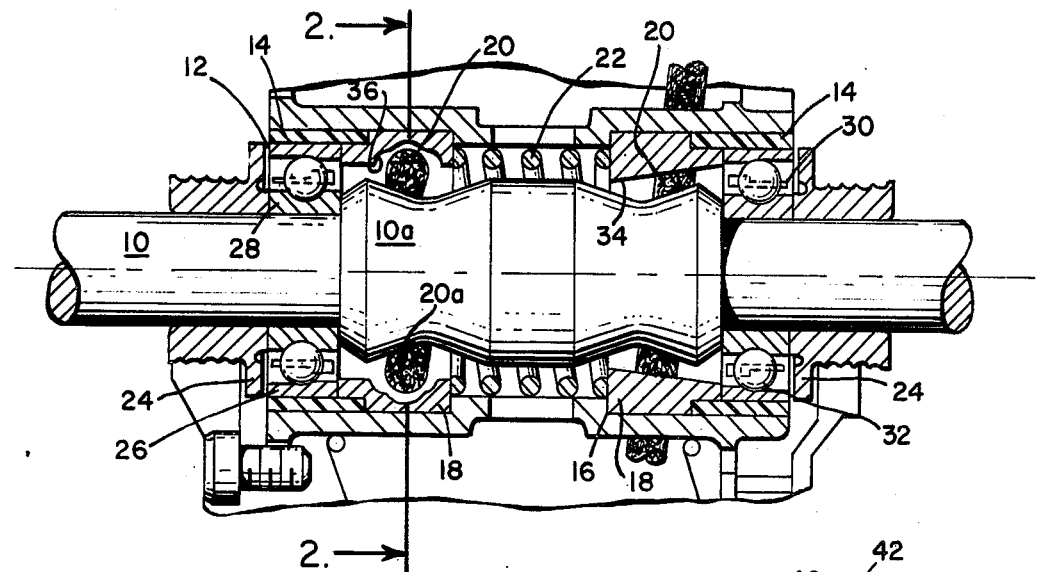
Fig. 2.
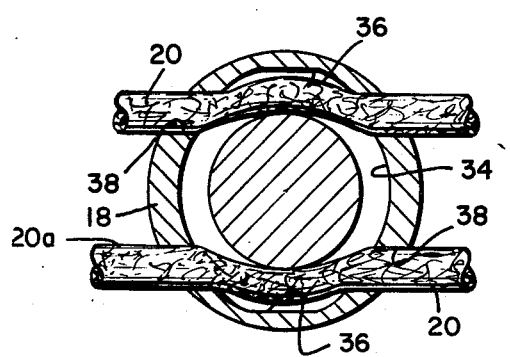
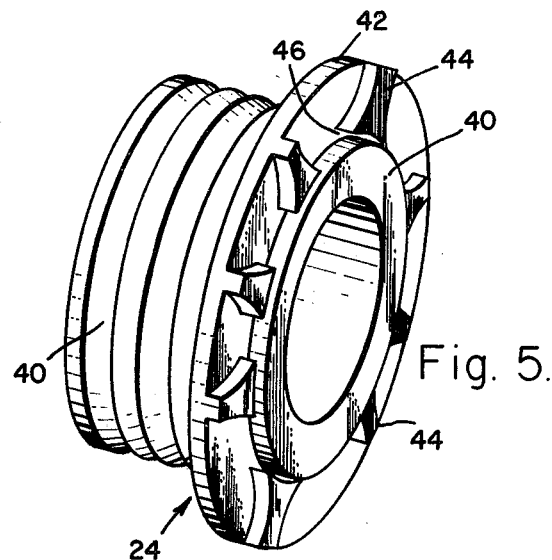
Fig. 5.
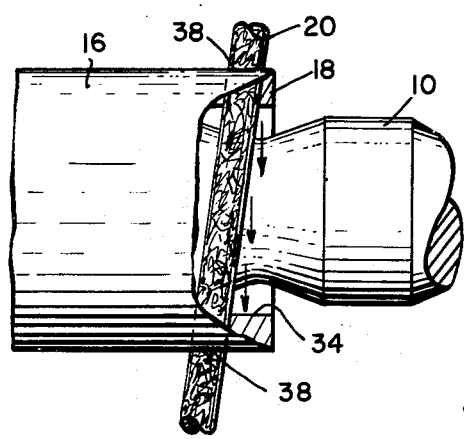
Fig. 3.
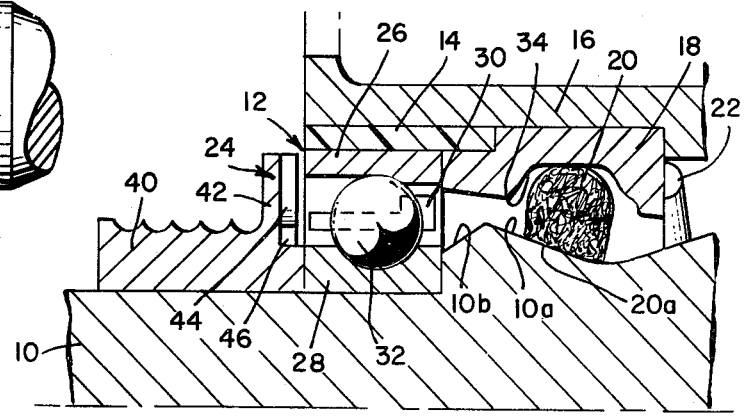
Fig. 4.

WICK LUBRICATION SCHEME FOR HIGH SPEED SHAFTS

This invention relates to lubrication and, more particularly, to a method and apparatus effective for lubricating the bearings of a high speed rotating shaft even at high altitude.

Wick lubrication schemes for shafts and bearings are well known. Examples of prior art systems are found in Reid, U.S. Pat. No. 696,594; Gunby, et. al., U.S. Pat. No. 786,757; Bronder, U.S. Pat. No. 815,260, Arnold, U.S. Pat. No. 1,733,931; and Hennessy, Jr., U.S. Pat. No. 3,292,979. These and other prior art lubrication systems operate generally by transporting oil to the shaft through a pad or wick arrangement so that the oil rubs off the wick or pad onto the shaft. High speed rotation of the shaft propels oil particles into the air near the bearing where the oil and air form an aerosol. The aerosol is drawn through the bearing by a fan or slinger and the oil provides lubrication for the bearings.

In prior art machines, the design of the shaft and wick combination was acknowledged to be critical and much attention was given to this interface. However, it was mistakenly believed that the formation of an oil/air mist was sufficient in itself and almost any kind of circulation system would be adequate to get the oil into the bearing. Although this is largely true at sea level or at low altitudes, it is sometimes necessary for rotating machinery to operate at altitudes of up to 80,000 feet or an atmospheric pressure of about 0.44 psia. At this point, and even at altitudes far less than this, the circulation of oil/air mist through a shaft bearing system is inhibited. Although the wicking action of a wool felt wick is not affected by altitude, the problem still remains to transport the oil particles when the transport medium, air, is almost non-existent.

In accordance with this invention, an improved wick lubrication scheme is provided whereby a wick is passed through a sleeve adjacent to a bearing and interacts with a shaft. The wick preferably has a cross-section providing a flat surface for engagement with the shaft so that enhanced oil transfer is possible. Additionally, the wick may cross the shaft diagonally so that an increased amount of transferred oil will be propelled from the shaft without striking the wick and being reabsorbed thereby. Further, the sleeve is shaped so as to transport oil which has collected thereon to the bearing such that bearing lubrication is not inhibited by the absence of air at high altitude to carry an aerosol.

The advantages of the bearing lubrication system of this invention can be best seen when the following specification is read in accordance with the appended drawings, wherein:

FIG. 1 is a cross-sectional view of a shaft and bearing incorporating the lubrication system of this invention;

FIG. 2 is a cross-sectional view of the lubrication system of FIG. 1 taken generally along the line 2—2 of FIG. 1;

FIG. 3 is a detail of the cross-sectional view of the lubricating system of FIG. 1;

FIG. 4 is a partially cut-away view of the lubrication system of FIG. 1; and

FIG. 5 is a perspective view of a slinger for use with the lubrication system of this invention.

Referring now to the drawings, FIG. 1 illustrates a shaft 10 and bearing assemblies 12 such as may be used in a typical turbocompressor or other piece of rotating machinery. The shaft 10 is journaled in the bearings 12 which are held in resilient mounts 14 within a housing 16. Each bearing has a lubricating sleeve 18 containing wicks 20 positioned in close proximity thereto to transport oil or other lubricating fluid from a source (not shown) to the bearing. The lubricating sleeves 18 are held against the bearings 12 by suitable means such as a compression spring 22. Also mounted on the shaft 10 and associated with each bearing 12 is a slinger 24 which acts to draw air/oil aerosol through the bearing 12.

The bearing 12 is best shown in FIG. 3 and has an outer race 26, an inner race 28, a separator 30 and a plurality of balls 32. The separator is positioned with respect to the inner and outer races such as to provide a larger separation space between it and the inner race 28 so that a substantial amount of lubricating aerosol may be drawn therethrough by operation of the slinger 24.

Lubrication is provided for each bearing assembly 12 by its associated lubricating sleeve 18 and wick 20 in cooperation with the shaft 10. The lubricating system is shown in FIGS. 2-4 wherein the lubricating sleeve is illustrated as having a cylindrical outer contour which may be modified in any manner appropriate to provide suitable interaction with adjacent parts. An inner surface 34 of the lubricating sleeve 18 is tapered to form a frustum of a cone having its greater diameter adjacent the bearing assembly 12 and no greater than the inner diameter of the outer race 26. A groove 36 is preferably provided in the inner surface 34 of the lubricating sleeve to accommodate passage of the wick 20 therethrough without undue compression of the wick. A plurality of apertures 38 are provided in the lubricating sleeve 18 to accommodate passage of the wicks 20. The apertures 38 are preferably drilled through the lubricating sleeve such that the center line of each aperture is generally tangent to the shaft 10 in its installed axial position.

Lubricant is carried from a sump (not shown) to the bearing by one or more wicks 20 which carry oil from the source through the apertures 38 to be removed by rotation of the shaft 10 with which it is in contact. Each wick 20 is preferably formed of felt for carrying oil from a cotton pack or wet subsource of lube oil (not shown). The wick 20 may be of any desired cross-section but is preferably provided with a generally flat surface 20a which is caused to engage the shaft 10. This results in an enhanced quantity of surface contact between the wick 20 and shaft 10 which causes a significantly increased transfer of oil from the wick to the shaft, thus improving performance of the lubricating system.

Oil transfer is further enhanced by causing the entering and exit hole 38 for each wick 20 to be longitudinally displaced on the lubricating sleeve 18 so that the wick 20 travels diagonally across the face of the shaft 10 as shown in FIG. 4. If the wick travels straight across the shaft, much of the oil removed from the wick is propelled from the shaft 10 at a position beneath the wick 20 so that the particles are propelled back to the wick. Much of this oil is reabsorbed into the wick and not available for lubrication of the bearing. By positioning the wick in the manner shown in FIG. 4, the oil is propelled into the air away from the wick, as shown by the arrows in FIG. 4, so that an increased amount of oil is available for lubrication of the bearing.

By incorporating these features, the lubricating system of this invention propels a substantial amount of oil spray into the air. At or near sea level, adequate lubrication of the bearing assembly 12 may be provided in a conventional manner. Some of the oil propelled from the shaft 10 forms an aerosol which may then be drawn through the bearing for surface lubrication.

This action is enhanced by the improved slinger 24 which is mounted on the shaft 10 and is best illustrated in FIGS. 3 and 5. The slinger 24 has a mounting portion 40 preferably having a cylindrical inner surface sized such that the slinger may be journaled on the shaft 10. A generally circular plate portion 42 extends radially outwardly from the mounting portion 40 and is machined to form a plurality of protrusions 44 thereof which are formed to provide the motion of air for drawing aerosol through the bearing assembly 12 while the shaft 10 is rotating. As best seen in FIG. 5, the protrusions 44 may readily be formed by machining circular cuts into the plate portion 42 regularly spaced circumferentially around the plate portion. However, such formation in itself would leave the space between the separator 30 and inner race 28 of the bearing assembly 12 blocked during a substantial portion of each rotation of the slinger so that air flow through this path would be limited. Accordingly, a circular groove 46 is machined into the plate portion around the mounting portion 40 so that the space between the inner space 28 and separator 30 is not blocked at any time (see FIG. 3) and airflow through this path is thus increased while the ability of the slinger to propel the aerosol is in no way diminished. In this manner, lubrication of the bearing assembly 12 is further enhanced.

A shaft portion 10a within the lubricating sleeve 18 may be conical (as shown) or cylindrical or otherwise suitably shaped in a manner to enhance the transfer of lubricating fluid from the wick surface 20a to the shaft 10. Whatever the shape of this shaft portion, however, it is preferred that the passage between the inner race 28 and the separator 30 not be blocked so that maximum flow of aerosol may be maintained therethrough. Accordingly, a portion 10b of the shaft is conically formed to provide a suitable opening.

The lubricating system of this invention thus provides optimum lubrication of system bearings during operation of the rotating machinery with which it is associated when positioned in an environment where an adequate quantity of an aerosol-carrying gas is available, e.g., operation at sea level or low altitude in a pressurized environment. Oil is carried from its source by the wicks 20, entering the lubricating sleeve 18 through the apertures 38. Adequate wick size is comfortably accommodated by the partial grooves 36. A flat surface 20a of the wick 20 contacts portion 10a of the rotating shaft 10. Interaction of the wick and rotating shaft causes substantial quantities of oil to be transferred from the wick to the shaft. Continued rotation of the shaft 10 propels oil particles from the shaft into the air. Because the wick in its preferred embodiment travels diagonally across the shaft, this oil is propelled into the air to be available for lubrication instead of being reabsorbed by the wick.

Operation of the slinger 24 draws air/oil aerosol through the bearing assembly 12, largely passing through the space provided between the inner race 28 and separator 30 wherein surface contact causes a substantial amount of oil to be available for bearing lubrication.

While this manner of lubrication operates excellently under the conditions previously described, a turbomachine may be required to operate under ambient conditions at high altitudes where atmospheric pressure may be as low as 0.44 psia or less. At such pressures, bearing lubrication by means of an aerosol is ineffective because insufficient quantities of the carrier, air, are available and the slinger 24 is unable to draw sufficient quantities of oil through the bearing. Thus, the bearing 12 could be insufficiently lubricated.

The lubrication system of this invention overcomes this problem by providing a suitable contour for the lubricating sleeve 18 to ensure adequate lubrication of the bearing races even at the low ambient pressures present at high altitudes.

During high altitude operation, the action of the wick 20 in carrying oil into the lubricating sleeve 18 is not changed. Also, interaction of the flat surface 20a of the wick 20 with the rotating shaft 10 continues to produce a high amount of transfer of oil to the shaft. This oil is again propelled tangentially from the shaft remaining available for lubrication due to the diagonal positioning of the wick. However, little or no aerosol is formed to carry the oil through the bearing and a large portion of the oil, is permitted to remain in the lubricating sleeve, might be reabsorbed in the wick 20 or migrate away from the bearing so that inadequate lubrication would be provided.

In accordance with this invention, the inner surface 34 of the lubricating sleeve 18 is provided with a generally conical contour, excepting the groove 36, with its inner diameter adjacent to the bearing 12 being greater than its inner diameter at the end removed from bearing 12 and smaller than the inner diameter of the adjacent outer race of bearing 12. Thus, the inner surface of the sleeve 18 acts as a ramp guiding the lubricating fluid as it is directed outwardly in its travels to move toward the bearing, ultimately transferring to the outer race 26 of the bearing where it lubricates all surfaces of the bearing by contact transfer from the outer race 26 to the balls 32. To facilitate transfer of oil from the lubricating sleeve 18 to the outer race 26, it is desirable that the inner diameter of the sleeve 18 adjacent the bearing 12 be slightly less than the inner diameter of the outer race 26.

Accordingly, lubrication at high altitudes and corresponding low ambient pressure is provided by oil droplets being propelled from the shaft 10 by its high rotation traveling until impacting against the inner surface 34 of the lubricating sleeve 18 where the droplets coalesce to form an oil film on the surface. Because the surface 34 tapers outwardly as it approaches the bearing 12, the continuous outwardly propelled stream of oil particles impacting against the surface 34 forces the oil film formed thereon to migrate toward the bearing 12 causing the outer race 26 and ultimately the entire bearing to be lubricated. Thus, wall geometry can be utilized to compensate for the failure of lubrication which occurs at low pressure due to the absence of a carrier for formation of an aerosol. At lower altitudes, where sufficient air for air aerosol lubrication is available, the surface geometry enhances lubrication by causing additional oil, not expended as an aerosol, to travel through the bearing for lubrication.

Thus, the lubrication system of this invention provides enhanced bearing lubrication by utilizing a flat surface wick for increased transfer rate, a diagonally directed wick to avoid reabsorption of oil after it has been flung from the shaft, improved slinger design for optimizing aerosol flow through the bearing, and suitably contoured surfaces for transporting oil in liquid form therealong to the bearing when ambient atmospheric pressure is insufficient to permit formation of adequate aerosol.

I claim:

1. A system for providing lubrication for a bearing for a shaft under high and low pressure conditions, said system comprising:

a shaft;

a bearing having an inner race mounted on said shaft, and an outer race;

sleeve means positioned around said shaft adjacent said bearing;

first and second openings in said sleeve means;

a lubricant-carrying wick extending through said first and second openings and engaging said shaft diagonally for transferring lubricant from said wick to said shaft;

surface means on said shaft disposed for propelling transferred lubricant therefrom upon rotation of said shaft;

slinger means mounted on said shaft adjacent said bearing opposite said sleeve means for drawing propelled lubricant through said bearing; and a tapered inner surface on said sleeve means for directing propelled lubricant to said bearing.

2. The system of claim 1 wherein said first and second openings are positioned to direct said wick across said shaft at an oblique angle with an axis of said shaft.

3. The system of claim 1 wherein said wick has a generally flat surface for engaging said shaft.

4. The system of claim 3 including groove means on said sleeve means inner surface to accommodate passage of said wick.

5. A method of lubricating a bearing for a rotating shaft, said method comprising the steps of:

carrying lubricating fluid from a source to a shaft through wick means;

causing said wick means to engage said shaft at an oblique angle with an axis of said shaft for transferring lubricating fluid to said shaft;

propelling droplets of lubricating fluid from said shaft;

drawing aerosol, formed with said propelled lubricating fluid, through said bearing; and positioning a tapered surface around said shaft where engaged by said wick and directing propelled lubricant therealong to said bearing.

* * * * *